US012692130B2

(12) United States Patent
Dragsits et al.

(10) Patent No.: US 12,692,130 B2
(45) Date of Patent: Jul. 28, 2026

(54) PASSENGER TRANSPORT SYSTEM HAVING A SUPPORT

(71) Applicant: INVENTIO AG, Hergiswil (CH)

(72) Inventors: Hannes Dragsits, Vienna (AT); Gerhard Kleewein, Pressbaum (AT); Christoph Makovec, Wiener Neustadt (AT); Peter Sefcsik, Györ (AT); Georg Wagenleitner, Roßleithen (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 18/832,080

(22) PCT Filed: Feb. 16, 2023

(86) PCT No.: PCT/EP2023/053945
§ 371 (c)(1),
(2) Date: Jul. 22, 2024

(87) PCT Pub. No.: WO2023/169797
PCT Pub. Date: Sep. 14, 2023

(65) Prior Publication Data

US 2025/0100850 A1 Mar. 27, 2025

(30) Foreign Application Priority Data

Mar. 10, 2022 (EP) .................................... 22161430

(51) Int. Cl.
*B66B 23/02* (2006.01)
*B66B 23/00* (2006.01)

(52) U.S. Cl.
CPC .................................... *B66B 23/00* (2013.01)

(58) Field of Classification Search
CPC .............................. B66B 23/02; B66B 23/026
(Continued)

(56) References Cited

U.S. PATENT DOCUMENTS 1,025,316 A * 5/1912 Seeberger ............... B66B 23/04
198/336
1,167,602 A * 1/1916 Strang .................. B60W 20/00
192/84.1

(Continued)

FOREIGN PATENT DOCUMENTS

CN 105712168 A 6/2016
CN 108203046 A 6/2018

(Continued)

OTHER PUBLICATIONS

US 2025/0100851 A1, Sefcsik et al., Mar. 27, 2025.*

(Continued)

*Primary Examiner* — Douglas A Hess
(74) *Attorney, Agent, or Firm* — Knobbe, Martens, Olson & Bear, LLP

(57) ABSTRACT

The present disclosure relates to a passenger transport system having a circulating transport belt and a drive for driving the belt. The passenger transport system has a support structure in which the transport belt is movably guided and the drive shaft is rotatably mounted. The passenger transport system also has a support which is arranged on a support structure in the region of a first end in order to support the first end of the support structure on a building structure. The support projects from the support structure starting at an underside of the support structure and in orthogonal direction relative to the longitudinal extent of the support structure. A motor is fastened to the support outside of an internal space defined by the support structure.

20 Claims, 3 Drawing Sheets

(58) Field of Classification Search
USPC .......................................................... 198/330
See application file for complete search history.

(56) References Cited

U.S. PATENT DOCUMENTS

| | | | | | |
|---|---|---|---|---|---|
| 2,005,067 | A | * | 6/1935 | Graff-Baker | B66B 23/12 198/332 |
| 2,949,178 | A | * | 8/1960 | Fabula | B66B 23/026 198/330 |
| 4,499,986 | A | * | 2/1985 | Tsuboi | H02P 25/18 198/810.01 |
| 5,160,009 | A | * | 11/1992 | Iyoda | B66B 23/24 198/337 |
| 5,348,131 | A | * | 9/1994 | Yamaguchi | B66B 23/026 198/321 |
| 6,450,317 | B1 | * | 9/2002 | Fargo | B66B 23/026 198/330 |
| 6,540,060 | B1 | * | 4/2003 | Fargo | B66B 23/02 198/833 |
| 6,685,002 | B1 | * | 2/2004 | Nurnberg | B66B 23/00 198/321 |
| 6,974,018 | B2 | * | 12/2005 | Lunardi | B66B 23/04 198/330 |
| 6,991,084 | B2 | * | 1/2006 | Lunardi | B66B 23/04 198/337 |
| 10,118,801 | B2 | * | 11/2018 | Huang | B66B 23/02 |
| 10,214,389 | B2 | * | 2/2019 | Turek | B66B 23/024 |
| 11,440,779 | B2 | * | 9/2022 | Ringler | B66F 7/10 |
| 12,415,709 | B2 | * | 9/2025 | Huang | B66B 23/16 |

FOREIGN PATENT DOCUMENTS

| | | | | | |
|---|---|---|---|---|---|
| DE | 2421729 | A1 | | 11/1975 | |
| DE | 2421729 | B2 | | 7/1980 | |
| DE | 2421729 | C3 | | 4/1984 | |
| DE | 10 2014/224471 | A1 | | 6/2016 | |
| EP | 3224185 | B1 | | 1/2020 | |
| GB | 2244464 | A | * | 12/1991 | B66B 23/026 |
| JP | 2003147990 | A | | 5/2003 | |
| JP | 6713955 | B2 | | 6/2020 | |
| RU | 2012110940 | A | | 9/2013 | |
| RU | 2508242 | C2 | | 2/2014 | |
| WO | WO-2011011262 | A1 | * | 1/2011 | B66B 23/026 |

OTHER PUBLICATIONS

US 2025/0162839 A1, Pan, May 22, 2025.*

International Search Report received in International Application No. PCT/EP2023/053945, dated Mar. 17, 2023.

* cited by examiner

PASSENGER TRANSPORT SYSTEM HAVING A SUPPORT

TECHNICAL FIELD

The present disclosure relates to a passenger transport system configured as an escalator or a moving walkway.

SUMMARY

Passenger transport systems such as escalators or moving walkways are often used for transporting large crowds of people. Escalators or moving walkways are therefore often to be found in department stores, airports, railway stations, or underground stations.

Passenger transport systems of the aforementioned type usually have a stable load-bearing system in the form of a support structure in which transport elements connected to a circulating transport belt are movably arranged. In the case of an escalator, this transport belt is designed as a step belt and in the case of a moving walkway it is designed substantially as a flat pallet belt. Said circulating transport belt is driven by means of a drive arranged in the support structure, which drive has at least one motor, at least one connecting gear, and a drive shaft operatively connected to the motor via the connecting gear. The transport belt is usually guided at an angle of 180° about the drive shaft, so that it can be deflected and driven by the drive shaft. Furthermore, balustrades with movable handrails are usually provided on both sides of the transport belt, which balustrades are driven synchronously with the transport belt via a handrail drive.

Due to high load forces occurring during operation of an escalator or moving walkway and, in particular, acting on the drive, the surrounding frame must be particularly stable in order to be able to absorb and dissipate the large forces acting on the drive.

Due to the little space available, and for architectural reasons, the motors and gears that serve to drive the escalators and moving walkways are to be arranged, if possible, in the space between and below the step belt or pallet belt in the support structure; this also applies to the handrail drive. In the case of extra-long escalators and moving walkways, however, the space in the support structure is not sufficient. RU 2 508 242 C2 therefore discloses a drive frame which is completely separate from the support structure and on which the drive shaft, the connecting gear and the motor are arranged. The drive frame and the support structure must be very well anchored in the building structure, since enormous tensile forces of the transport belt act between the two parts. Moreover, the building structure must be designed in this region such as to be able to sufficiently support these tensile forces.

Depending on the type of building structure in which the passenger transport system is to be used, it may also be necessary to service the passenger transport systems from below. EP 3 224 185 B1 discloses such an escalator which can be serviced from below. In that case, the gear housing of the connecting gear serves as a carrier for the motors and the drive shaft and has a set of gearwheels of a reduction gear assembly in its interior. The gear housing serving as a carrier must be designed to be very resilient and rigid and therefore has very large dimensions. Moreover, such a gear housing is very difficult and expensive to produce. In most cases, due to this multifunctional design, the entire drive has to be removed as a whole during maintenance work, which requires a considerable amount of space that must be realized in the building structure. CN 105 712 168 A discloses an escalator, the support structure of which is supported on the building structure by means of a support arranged on its underside.

The object of the present disclosure is therefore to provide a drive configured for, in particular, extra-long escalators with large transport height and for very long moving walkways, wherein the space required in the building structure and the production costs of the drive should be kept as low as possible.

This object can be achieved by a passenger transport system configured as an escalator or moving walkway. The passenger transport system can comprise a circulating transport belt which can be composed of a plurality of transport elements, and a drive for driving the transport belt. The drive can comprise at least one motor, at least one connecting gear, and a drive shaft which is operatively connected to the motor via the connecting gear. The transport belt can be guided via the drive shaft and can be moved with the drive shaft. The passenger transport system can also have a support structure in which the transport belt is arranged such as to be movably guided. As regards to its longitudinal extent, the support structure can be defined by two ends, wherein the drive shaft is rotatably mounted in the support structure in the region of a first end of the support structure. The longitudinal extent of the support structure or of the passenger transport system can substantially correspond to the direction of its longest extension or to a transport direction of the transport belt.

Furthermore, the passenger transport system can have a support which is arranged on the support structure in the region of the first end and can be provided to support the first end of the support structure on a building structure in the intended installation position of the passenger transport system. For this purpose, the support can project below an underside of the support structure by projecting from the underside at least in the orthogonal direction. The at least one motor can be fastened to the support outside of an internal space defined by the support structure. If several motors are present which drive the drive shaft, all motors can preferably be fastened to the support.

In other words, the support can project from the support structure starting at an underside of the support structure and in orthogonal direction relative to the longitudinal extent of the support structure. The support may not have to end at the underside, but can also extend into the internal space of the support structure defined by the support structure.

In other words, the support may not only support the weight of the passenger transport system acting there and possibly any laterally acting operating forces at the first end of the passenger transport system, but can also serve as a mounting location for the at least one motor. The support thus can offer an extremely stable and rigid base, and the motor(s) can be mounted without large adjustment work in relation to the other parts of the passenger transport system. The counter-torque and the weight of the motor can be supported directly via the support in the building structure, as a result of which the connecting gear housing can be decoupled from forces of the motor and can thus be designed to be weaker and can be produced in a more cost-efficient manner. The same can also apply to the drive shaft mounted in the support structure, because the weight of the drive shaft and the tensile forces of the transport belt acting on the drive shaft can be supported directly via the support structure, which means that the connecting gear housing may not additionally be loaded here either. Moreover, with this drive arrangement, the motor, the drive shaft and, depending on the specific configuration, even the connecting gear can be easily removed and serviced independently of one another.

In one embodiment of the present disclosure, an intermediate gear can be arranged between the motor and the connecting gear. The motor can be fastened to the support via a housing of the intermediate gear. The housing of the intermediate gear thus can also support the weight and counter-torques of the motor on the support. Since, as a result, the intermediate gear may be arranged outside the support structure, accessibility for maintenance work may also be very good.

The intermediate gear can preferably be a hypoid gear, a hypoid spur gear, or a worm gear. A hypoid spur gear is an at least two-stage gear having a hypoid gear stage and a spur gear stage. Such gears can allow for easily arranging a drive axle of the motor in the longitudinal extent of the passenger transport system so that, with regard to a width of the support structure, two motors can be arranged next to one another, if required. Moreover, the design of the intermediate gear as a worm gear, hypoid spur gear, or hypoid gear in a minimum of space can allow for a high gear ratio in the range of 1:5 to 1:40.

The connecting gear can preferably be designed as a spur gear. This may allow for aiming at a very flat design of the housing, so that no additional space in the width of the passenger transport system is required at the first end. In that case, the connecting gear can have a gear ratio from its output shaft to its input shaft in the range of 1:1 to 1:20.

In one embodiment of the present disclosure, the connecting gear and the intermediate gear can be connected to one another in a torque-transmitting manner via an elastic coupling. This can have the advantage that vibrations in the drive train are damped. Moreover, axle errors between the gear shafts of the two gears to be connected to one another can also be compensated by the elastic coupling. The elastic coupling may be for example a claw coupling or pin coupling with elastic intermediate elements made of metal or plastic.

In one embodiment of the present disclosure, the drive shaft can protrude through a connecting gear housing of the connecting gear. As a result, the connecting gear can be pivotably mounted in the support structure via the protruding drive shaft. In order to support torques and thereby relieve the elastic coupling, the connecting gear can also be supported on the support or on the support structure via a torque support. As a result of this design, the connecting gear housing can ideally be decoupled from external forces. The connecting gear can be configured such that its output shaft comprises a bore through which the drive shaft can protrude. Where appropriate, the output shaft with its output spur gear wheel can be configured to be divided into two halves (the separating plane can comprise the axis of rotation of the output shaft and of the output spur gear wheel), and the connecting gear housing and the roller bearings can be analogously configured to be divisible in the region of the output shaft. By opening the connecting gear housing at this point and removing the output spur gear wheel, the connecting gear can be removed from the drive shaft without removing the drive shaft from the support structure.

In a further embodiment of the present disclosure, the support can be releasably fastened to the support structure with fastening means. This can have the advantage that, for example, the support can be first mounted in the building structure, and the first end of the support structure can then be placed onto the support. As a result, the support structure or support structure portion to be introduced into the building structure may be less bulky.

In a further embodiment of the present disclosure, the support can have a height-adjustable base region. This can allow for a precise height adjustment of the passenger transport system relative to an adjacent floor of the building structure. As a result, a foundation of the building structure on which the support can be mounted to can be produced with less precision and hence more cost-efficiently. Moreover, no additional materials such as a set of spacer sheets or the like may be required.

In order to be able to accommodate the remaining components, the support structure can have a U-shaped cross section transversely to the longitudinal extent of the passenger transport system, which cross section can be formed by two side parts and a bottom structure of the support structure. Guide rails for the transport belt, the transport belt itself, returning portions of handrails, and the like can be arranged in the free space between the side parts. The bottom structure can be arranged at the lower edges of the side parts with respect to the installation position of the support structure in a building structure, and can connect them firmly to one another. Top chords can be present on the upper side of the side parts, wherein first ends of the side parts and the first end of the bottom structure can form the first end of the support structure.

In a further embodiment of the present disclosure, top chord end portions of the two top chords can be present in the region of the first end of the support structure, which in the longitudinal extent of the support structure can protrude beyond the support, the bottom structure, and the remaining components of the side parts. The top chord end portions can serve as carriers of a floor cover of the passenger transport system. The floor cover can be configured as a walkable surface and can span the region between a floor of the building structure and the transport belt. This can create a very stable resting of the floor cover on the support structure.

In a further embodiment of the present disclosure, the top chord end portions can project beyond the at least one motor. The floor cover that can be arranged on the top chord end portions thus can cover components of the drive arranged underneath.

In a further embodiment of the present disclosure, the support structure can comprise two L-shaped sidewalls each comprising a vertical leg and a horizontal leg. A sidewall with its vertical leg can be fastened to the first end of each side part, wherein the two sidewalls can be arranged parallel to one another and their horizontal legs can extend parallel to the top chord end portions of the passenger transport system. Preferably, the vertical leg and the sidewall can be connected to one another with weld seams, but the sidewalls can also be soldered or glued to the side parts. Of course, positive-locking and force-locking connections such as screws, pins, rivets, and the like can also be used.

In a further embodiment of the present disclosure, a bearing block with a roller bearing can be arranged on each horizontal leg of the sidewalls for rotatably supporting the drive shaft. In other words, the horizontal legs can form a type of fork at the first end of the support structure, on which fork the bearing blocks can be arranged and between which the drive shaft can be rotatably mounted.

In a further embodiment of the present disclosure, the bearing block can be fastened to the sidewall by adjusting means such as to be adjustable in its position relative to the sidewall. As a result, the drive shaft can be adjusted relative to the support structure so that chain wheels arranged on the drive shaft can be aligned with the transport belt and the axis of rotation of the drive shaft can be aligned correctly.

BRIEF DESCRIPTION OF THE DRAWINGS

Embodiments of the present disclosure will be described below with reference to the accompanying drawings, wherein neither the drawings nor the description are intended to be interpreted as limiting the present disclosure. Identical or equivalent features have the same reference signs. In the drawings.

The figures are merely schematic and not true to scale. In the different figures, identical reference signs denote identical or similar features.

DETAILED DESCRIPTION

Figure 1:
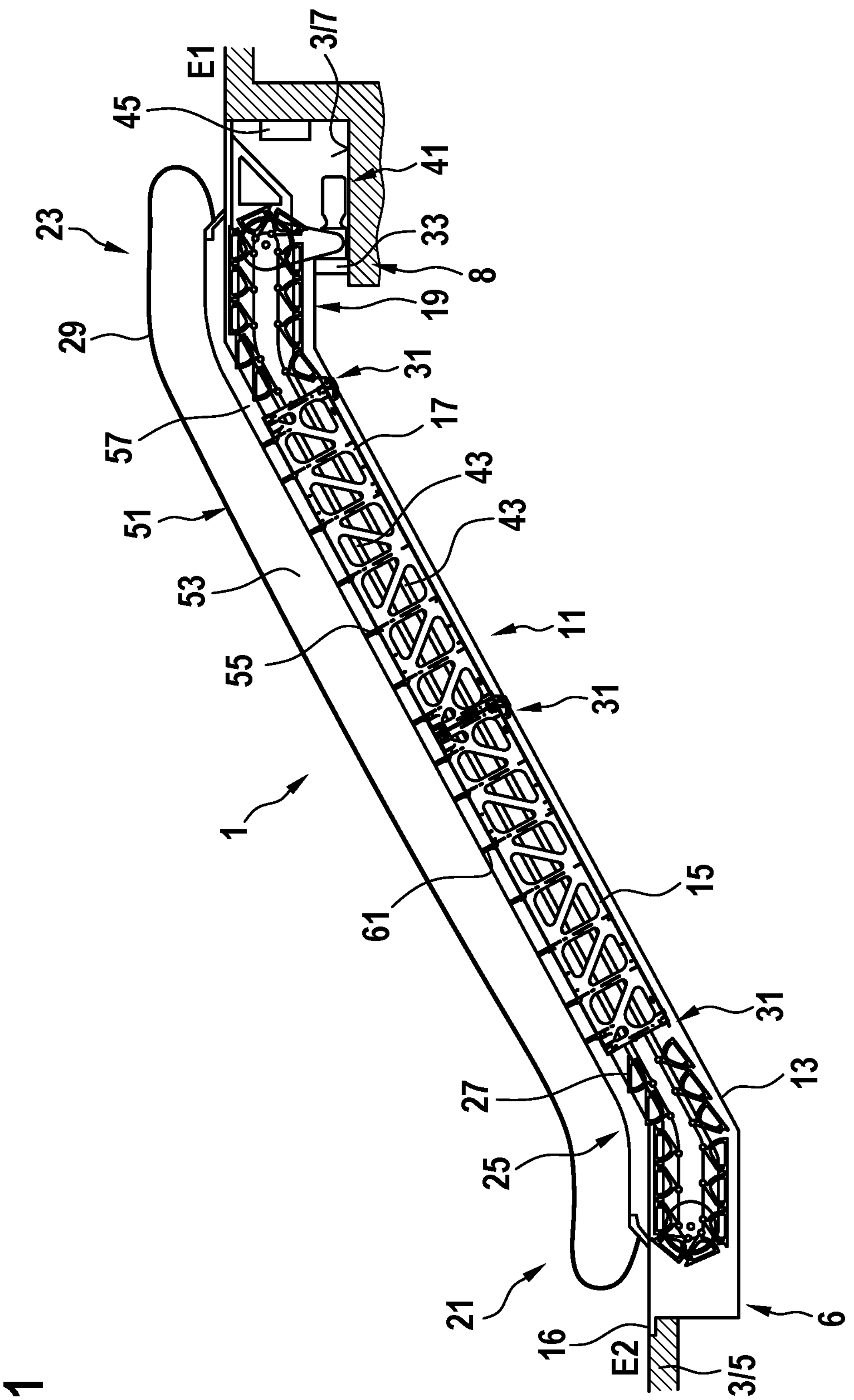
FIG. 1 shows a schematic side view of a passenger transport system according to the present disclosure, the first end of which is supported via a support in a building structure, and the second end of which is supported via a support bracket in the building structure.

FIG. 1 shows a schematic side view of a passenger transport system 1 configured as an escalator, which connects a first level E1 to a second level E2 of a building structure 3. The passenger transport system 1 comprises a support structure 11 composed of four support structure modules 13, 15, 17, 19 that are connected in series with one another. A first end 8 of the support structure 11 is supported on a foundation floor 7 of level E1 via a support 33 arranged on the floor side. A second end 6 of the support structure 11 is supported on the floor 5 of level E2 via a support bracket 16 arranged on the face side. Instead of being supported via a support bracket 16, the second end 6 can also be supported on the floor 5 of level E2 with a support arranged on the base side of the support structure 11.

The first support structure module 13 arranged in level E2 comprises an access region 21. The fourth support structure module 19 also comprises an access region 23 and is arranged in level E1. The second support structure module 15 and the third support structure module 17 are arranged between, and can connect, the first support structure module 13 and the fourth support structure module 19. For the sake of clarity, only the outlines of the first and fourth support structure modules 13, 19 were shown. The second and third support structure modules 15, 17 are shown in more detail and have an identical structure in the present embodiment. The support structure modules 13, 15, 17, 19 are connected to one another via connection points 31. Releasable connecting devices, such as high-strength bolts, are usually used for this purpose.

The support structure 11 can bear the load of all remaining components of the passenger transport system 1 and can support them on the building structure 3. Such components are, for example, a drive 41, guide rails 43, and a controller 45 for controlling the drive unit 41. A transport belt 25 is furthermore arranged between the side parts 63, 65 of the support structure 11 described further herein in FIGS. 2 and 3. The transport belt 25 of the passenger transport system 1 comprises steps 27. In the case of a moving walkway, the transport belt 25 could have pallets instead of steps 27. The transport belt 25 is guided by the guide rails 43 such as to move in a circular manner and can be driven by the drive 41.

Two balustrades 51 (only one of which is visible due to the side view shown in FIG. 1) that can be assembled from balustrade components 53, 55, 57 are erected above the support structure 11, wherein the balustrades 51 are arranged on both sides of the transport belt 25, namely fastened to fastening flanges 61 of the support structure 11. A handrail 29 is arranged on each of the two balustrades 51 such as to move in a circular manner. The two handrails 29 are also driven synchronously with the transport belt 25 with the drive 41.

Figure 2:
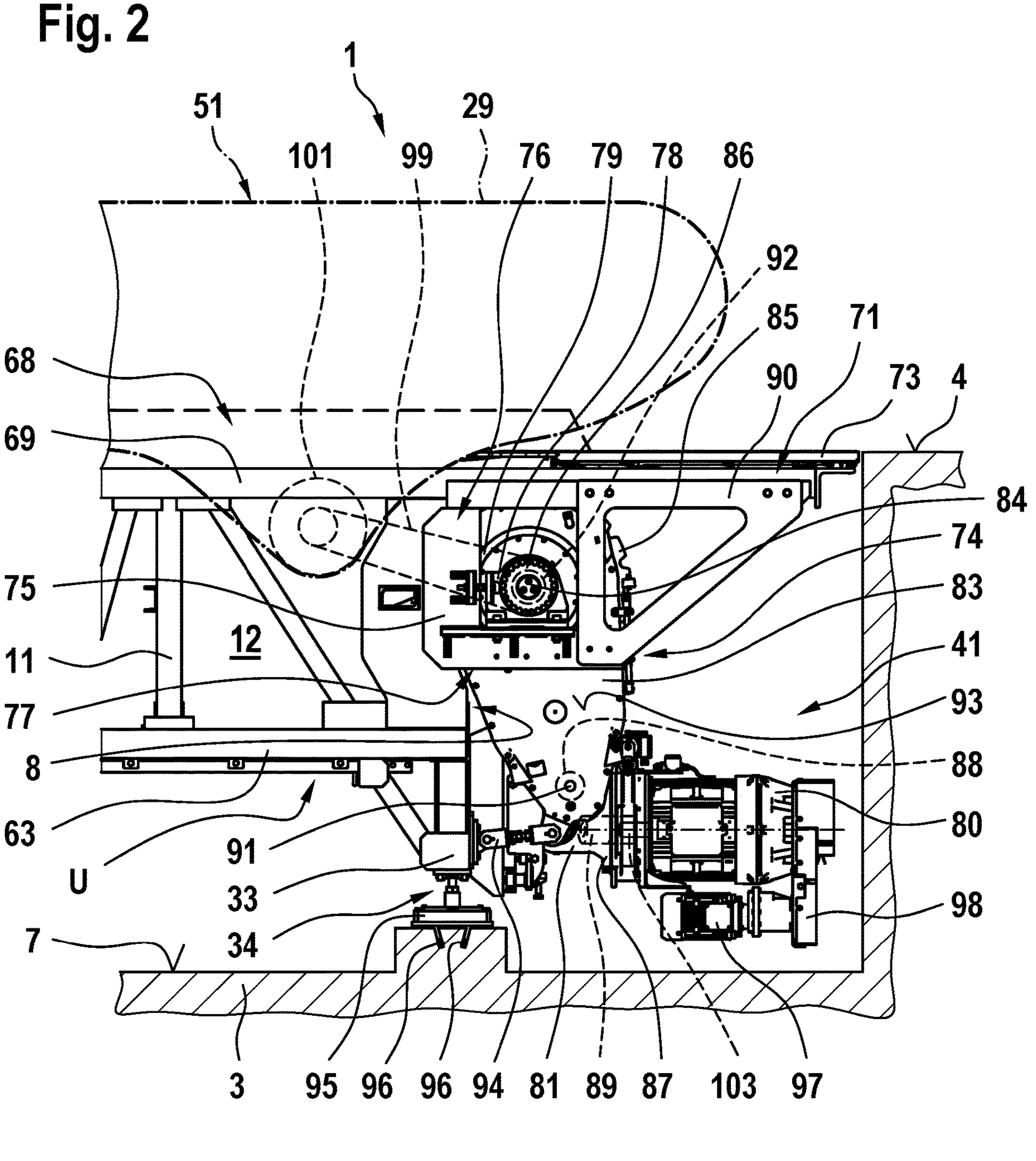
FIG. 2 shows an enlarged and detailed side view of the first end of the passenger transport system from FIG. 1.
Figure 3:
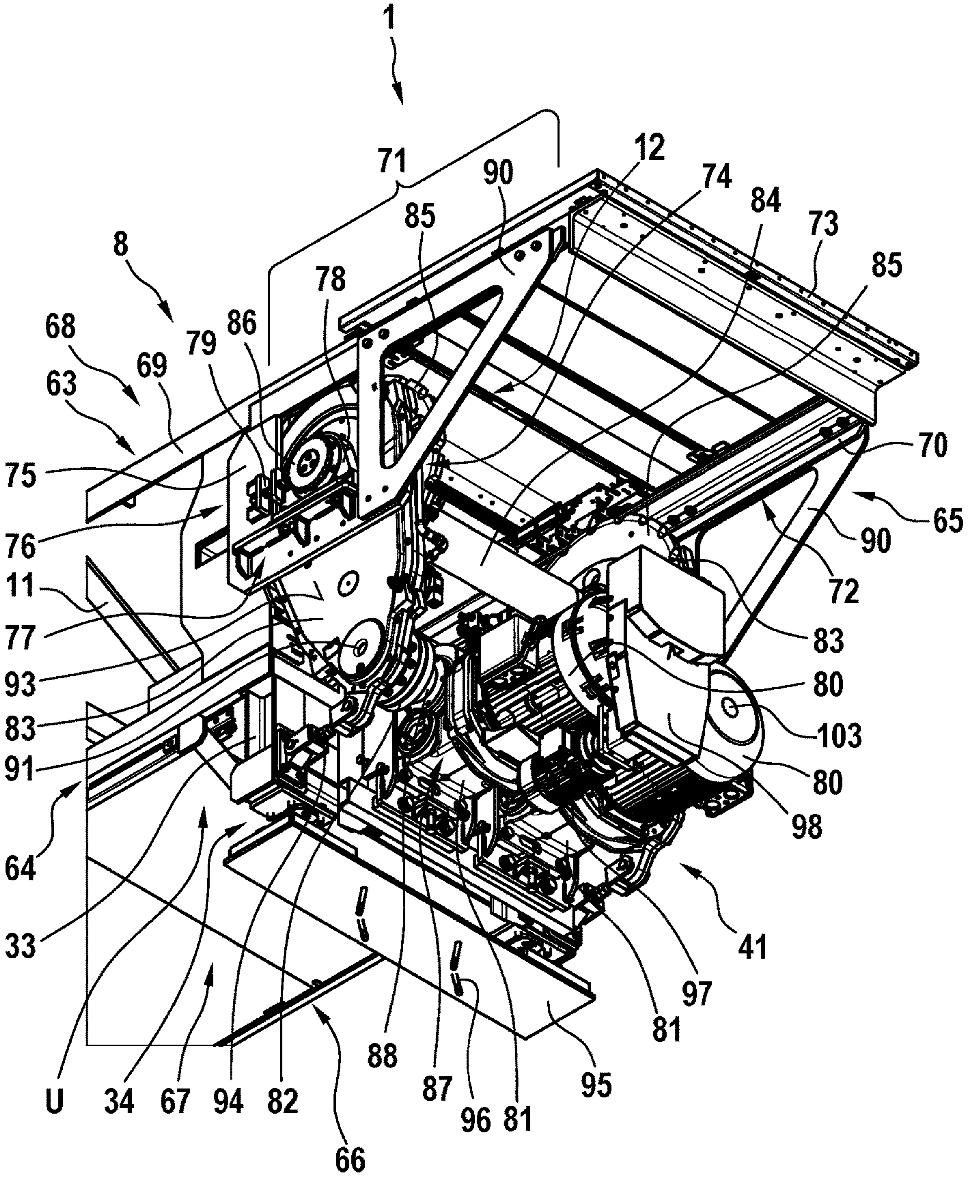
FIG. 3 shows a three-dimensional view, from below, of the first end of the passenger transport system shown in FIG. 2, without adjacent contours of the building structure.

FIGS. 2 and 3 both show the first end 8 of the support structure 11 from FIG. 1 in an enlarged and more detailed side view, or in a three-dimensional view from below. The two figures are described jointly. The position words "below" and "above," and the features "underside" and "upper side" used hereinafter refer to the installation position of the support structure 11 in the building structure 3.

The first end 8 of the support structure 11 is supported on the building structure 3 with the support 33 in the intended installation position of the passenger transport system 1. For the sake of clarity, the building structure 3 is shown only in FIG. 2, but not in FIG. 3. The support 33 protrudes from the support structure 11 starting at an underside U of the support structure 11 and in orthogonal direction relative to the longitudinal extent thereof.

As can be seen in particular in FIG. 3, the support structure 11 has a U-shaped cross section transversely to the longitudinal extent of the passenger transport system 1, which cross section is formed by two side parts 63, 65 and a bottom structure 67 of the support structure 11. The bottom structure 67 is arranged at the lower edges 64, 66 of the side parts 63, 65 and connects them firmly to one another. Top chords 69, 70, which project as top chord end portions 71, 72 beyond the first end 8 of the support structure 11 in the longitudinal extent of the passenger transport system 1, are present on the upper side 68 of the side parts 63, 65. By definition, the first end 8 of the support structure 11 is formed by the first ends of the side parts 63, 65 and the first end of the bottom structure 67, and not by protruding regions such as the top chord end portions 71, 72. The top chord end portions 71, 72 serve as carriers of a floor cover 73 of the passenger transport system 1. The drive 41, which is completely spanned by the floor cover 73, is arranged below the top chord end portions 71, 72.

The support structure 11 also comprises two L-shaped sidewalls 75 (only one of which is visible), which each comprise a vertical leg 76 and a horizontal leg 77. Below the top chord end portions 71, 72, a respective sidewall 75 can be welded with its vertical leg 76 to each side part 63, 65. The two sidewalls 75 are arranged parallel to one another, wherein their horizontal legs 77 extend parallel to the top chord end portions 71, 72 of the support structure 11.

The already mentioned drive 41 copmrises a motor 80, an intermediate gear 81, a connecting gear 83, and a drive shaft 84 following its drive train. The drive shaft 84 is thereby operatively connected to the motor 80 in a speed-reducing and torque-transmitting manner.

As can be seen in particular in FIG. 3, the drive 41 comprises two motors 80, two intermediate gears 81, and two connecting gears 83 (one of which is hardly visible), which can act in parallel on the drive shaft 84, in a torque-transmitting manner. The number of motors 80 to be used can depend on the intended transport height (vertical distance of levels E1 and E2) and on the length of the passenger transport system 1. As shown in FIG. 1, the transport elements 27 connected to form a circulating transport belt 25 are guided via the drive shaft 84. In FIGS. 2 and 3, the transport belt 25 was omitted for reasons of clarity so as to show the two drive sprockets 85 of the drive shaft 84, via which the transport belt 25 is deflected and driven.

A bearing block 78 with a roller bearing (not visible since located inside the bearing block) can be arranged on each horizontal leg 77 of the two sidewalls 75, in which bearing blocks the drive shaft 84 can be rotatably mounted. The two bearing blocks 78 can be fastened to the sidewall 75 by adjusting means 79 such as to be adjustable in their position relative to the sidewall 75. For better mutual support, a leg end 74 of a horizontal leg 77 is connected in each case to the top chord end portion 71, 72 arranged thereabove with a releasable triangular frame 90. Screws, pins, and the like can be used for a releasable connection. The support structure 11 thus can define an internal space 12 with its two side parts 63, 65, its bottom structure 67, its two sidewalls 75, and its two triangular frames 90. The drive shaft 84 is arranged in the internal space 12 such as to be rotatable.

The motor 80 can be fastened to the support 33 via a housing 87 of the intermediate gear 81 outside of the internal space 12 defined by the support structure 11. The intermediate gear 81 can be a hypoid gear, hypoid spur gear, or worm gear and can have a gear ratio from its output shaft 88 to its input shaft 89 in the range of 1:5 to 1:40. A motor shaft 103 of the motor 80 is connected to the input shaft 89 of the intermediate gear 81. The output shaft 88 of the intermediate gear 81 is connected to an input shaft 91 of the connecting gear 83 in a torque-transmitting manner via an elastic coupling 82. An auxiliary motor 97, which can be coupled to the motor shaft 103 of the motor 80 with a clutch gear 98, is arranged below one of the two motors 80. The auxiliary motor 97 can be provided to move the transport belt 25 at very low speed during maintenance work.

The connecting gear 83 can be configured as a multi-stage spur gear and can have a gear ratio from its output shaft 92 to its input shaft 91 in the range of 1:1 to 1:20. The output shaft 92 of the connecting gear 83 can be configured as a hollow shaft in which the drive shaft 84 is arranged so as to protrude. The drive shaft 84 also protrudes through a connecting gear housing 93 of the connecting gear 83. As a result, the connecting gear 83 can be, on the one hand, pivotably mounted in the support structure 11 via the protruding drive shaft 84. On the other hand, the connecting gear 83 can also be supported on the support 33 via a torque support 94. In the present exemplary embodiment, the connecting gear 83 is thus arranged partially within the internal space 12 and partially outside the internal space 12.

A chain wheel 86, which can drive a handrail drive wheel 101 via a circulating chain 99, is arranged on both face sides of the drive shaft 84. The handrail 29 schematically shown as a dot-dashed line can be driven with the handrail drive wheel 101 shown as a discontinuous line in FIG. 2.

The support 33 can be releasably fastened to the support structure 11 with fastening means. In the exemplary embodiment shown, however, the support 33 is welded to the support structure 11. Moreover, the support 33 has a height-adjustable base region 34. This can allow for a precise height adjustment of the passenger transport system 1, or rather of its floor cover 73, relative to an adjacent floor 4 of the building structure 3. The base region rests on a foundation plate 95, which is anchored to the foundation floor 7 in the building structure 3 with anchor screws 96.

While FIGS. 1 to 3 show a welded support structure 11, it is obvious that riveted, clinched, screwed, glued, or other support structures 11 can also be used for the present disclosure.

Finally, it should be noted that terms such as "having," "comprising," etc. do not preclude other elements or steps, and terms such as "a" or "one" do not preclude a plurality. Reference signs in the claims should not be considered to be limiting.

The invention claimed is:

1. A passenger transport system configured as an escalator or moving walkway comprising a circulating transport belt and a drive configured for driving the circulating transport belt, wherein the drive comprises at least one motor, at least one connecting gear, and a drive shaft operatively coupled to the at least one motor via the at least one connecting gear, wherein the circulating transport belt is guided via the drive shaft and is configured to be moved with the drive shaft, and comprising a support structure in which the circulating transport belt is arranged such as to be configured to be movably guided, and wherein the drive shaft is rotatably mounted in the support structure in a region of a first end of the support structure, wherein:

the passenger transport system comprises a support which is arranged on the support structure in the region of the first end and is configured to support the first end of the support structure on a building structure in an intended installation position of the passenger transport system; and wherein the support projects below an underside of the support structure by projecting from the underside at least in the orthogonal direction; and wherein the at least one motor is fastened to the support outside of an internal space defined by the support structure.

2. The passenger transport system of claim 1, wherein an intermediate gear is arranged between the at least one motor and the at least one connecting gear, and the at least one motor is fastened to the support via a housing of the intermediate gear.

3. The passenger transport system of claim 2, wherein the intermediate gear is a hypoid gear, a hypoid spur gear, or worm gear and has a gear ratio from its output shaft to its input shaft in a range of 1:5 to 1:40.

4. The passenger transport system of claim 3, wherein the at least one connecting gear and the intermediate gear are coupled to one another in a torque-transmitting manner via an elastic coupling.

5. The passenger transport system of claim 2, wherein the at least one connecting gear and the intermediate gear are coupled to one another in a torque-transmitting manner via an elastic coupling.

6. The passenger transport system of claim 2, wherein the at least one connecting gear is a spur gear and has a gear ratio from its output shaft to its input shaft in a range of 1:1 to 1:20.

7. The passenger transport system of claim 2, wherein the drive shaft protrudes through a connecting gear housing of the at least one connecting gear such that the at least one connecting gear is pivotably mounted in the support structure via the protruding drive shaft and the at least one connecting gear is supported on the support or on the support structure via a torque support.

8. The passenger transport system of claim 2, wherein the support is releasably fastened to the support structure with fastening means.

9. The passenger transport system of claim 2, wherein the support comprises a height-adjustable base region.

10. The passenger transport system of claim 1, wherein the at least one connecting gear is a spur gear and has a gear ratio from its output shaft to its input shaft in a range of 1:1 to 1:20.

11. The passenger transport system of claim 1, wherein the drive shaft protrudes through a connecting gear housing of the at least one connecting gear such that the at least one connecting gear is pivotably mounted in the support structure via the protruding drive shaft and the at least one connecting gear is supported on the support or on the support structure via a torque support.

12. The passenger transport system of claim 1, wherein the support is releasably fastened to the support structure with fastening means.

13. The passenger transport system of claim 1, wherein the support comprises a height-adjustable base region.

14. The passenger transport system of claim 1, wherein the support structure comprises a U-shaped cross section transversely to the longitudinal extent of the passenger transport system, wherein the U-shaped cross section is formed by two side parts and a bottom structure of the support structure, wherein the bottom structure is arranged at lower edges of the two side parts with respect to an installation position of the support structure in the building structure and couples them firmly to one another, and wherein top chords are positioned on an upper side of the two side parts, wherein first ends of the two side parts and the first end of the bottom structure form the first end of the support structure.

15. The passenger transport system of claim 14, wherein top chord end portions of the top chords are positioned in the region of the first end of the support structure, which in the longitudinal extent of the support structure protrude beyond the support, the bottom structure, and remaining components of the two side parts and which are configured as carriers of a floor cover of the passenger transport system.

16. The passenger transport system of claim 15, wherein the top chord end portions project beyond the at least one motor.

17. The passenger transport system of claim 16, wherein the support structure comprises two L-shaped sidewalls, which each comprise a vertical leg and a horizontal leg, and the two L-shaped sidewalls with their vertical legs are each fastened to the first end of each side part of the support structure, wherein the two L-shaped sidewalls are arranged parallel to one another and their horizontal legs extend parallel to the top chord end portions of the passenger transport system.

18. The passenger transport system of claim 15, wherein the support structure comprises two L-shaped sidewalls, which each comprise a vertical leg and a horizontal leg, and the two L-shaped sidewalls with their vertical legs are each fastened to the first end of each side part of the support structure, wherein the two L-shaped sidewalls are arranged parallel to one another and their horizontal legs extend parallel to the top chord end portions of the passenger transport system.

19. The passenger transport system of claim 18, wherein a bearing block with a roller bearing is arranged on each horizontal leg of the two L-shaped sidewalls for rotatably supporting the drive shaft.

20. The passenger transport system of claim 19, wherein the bearing block is fastened to at least one of the two L-shaped sidewalls by adjusting means such as to be adjustable in its position relative to the at least one of the two L-shaped sidewalls.

* * * * *